No. 859,607. PATENTED JULY 9, 1907.
P. LAMURE.
WHEEL WITH ELASTIC SPOKES.
APPLICATION FILED MAR. 22, 1906.
2 SHEETS—SHEET 1.
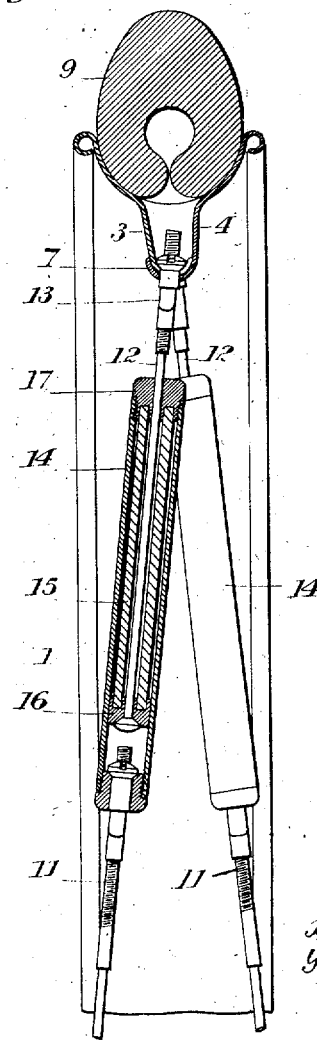
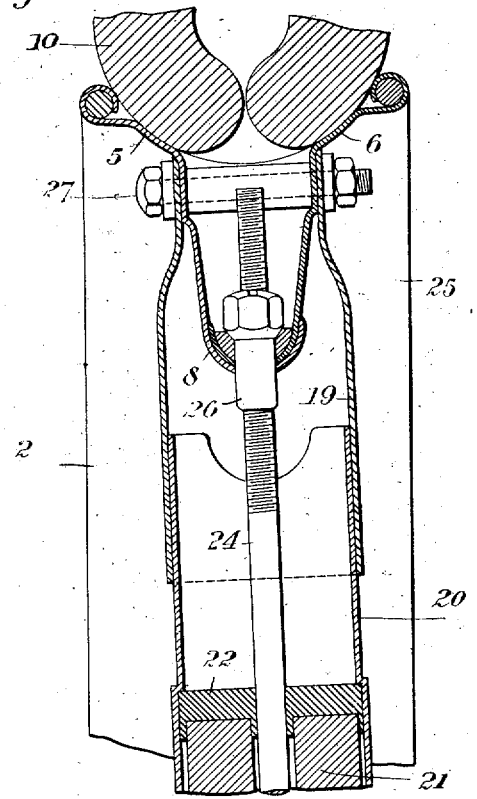
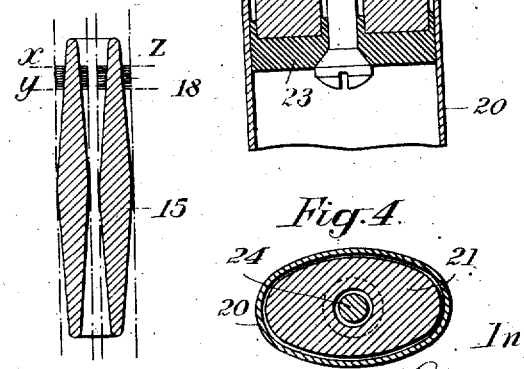
Inventor
Pierre Lamure,
by Finnes, Appleman
Attorney.
Witnesses:
L. E. Barkley

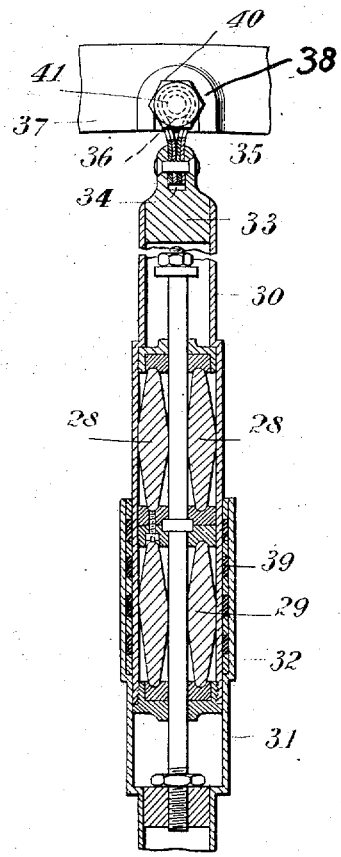

UNITED STATES PATENT OFFICE.

PIERRE LAMURE, OF BOIS-COLOMBES, FRANCE.

WHEEL WITH ELASTIC SPOKES.

No. 859,607.  Specification of Letters Patent.  Patented July 9, 1907.

Application filed March 22, 1906. Serial No. 307,417.

*To all whom it may concern:*

Be it known that I, PIERRE LAMURE, a citizen of the French Republic, and a resident of Bois-Colombes, France, have invented certain new and useful Improvements in Wheels with Elastic Spokes, of which the following is a specification.

This invention relates to a wheel with elastic spokes which may be applied to any kind of vehicles; bicycles, motocycle, cars with mechanical or animal traction and so on.

The effect of the spokes is to do away with the shocks and the violent movements caused by the unevenness of the road and to reduce the force necessary for the traction of the vehicle.

One of the objects of this invention is to provide a wheel wherein the elasticity of the spokes is obtained by the compression of a rubber plug or sleeve or any other elastic body the compression being directly proportionate to the tension.

Another object of the invention is to provide a wheel having a rigid rim formed by two non soldered steel plate rings which are separately stamped and united in order to form the section of the groove which section is especially rigid.

In the drawings: Figure 1, is a view partly in section and partly in elevation of a fragment of a wheel with one form of the invention applied thereto. Fig. 2, is a sectional view of a spoke shown in Fig. 1. Fig. 3, is a view in section of a wheel showing a modified form of the invention. Fig. 4, is a cross section of a spoke employed in the form illustrated in Fig. 3. Fig. 5, is a sectional view of a modified form of the elastic sleeve. Fig. 6, is a sectional view of a still further form of the invention.

In the drawings 1 and 2 denote, in Figs. 1 and 3 respectively, the rim of the wheels formed of two steel plates 3, and 4; 5 and 6, united by a setting 7 and 8 in such a manner as to form a groove for the tire 9 and 10.

The rim is connected with the nave by elastic spokes which exert on the rim a continuous and uniformly distributed tractional strain.

The spokes 11 and 12 of the light wheel, Fig. 1 and 2, are attached in the usual manner to the hub or nave by a button and to the rim by a tightening nut 13. The method of mounting these spokes does not differ from that of the ordinary spokes of a wheel with tangent or direct spokes; however the steel wires forming these spokes are divided in two parts 11 and 12 united by the tube 14 surrounding the rubber plug 15. One of the parts 11, of each wire connects the hub to the tube 14;
the second 12 connects the wire with a washer 16 sliding inside the tube, and the rubber plug 15 arranged between this washer and the stopper or plug 17 which closes the end of the tube opposite the hub is thus compressed between the washer 16 and the stopper or plug 17 by the tension of the spoke.

In order to allow of the elasticity of the rubber sleeve being freely developed, it is necessary to provide between the latter, the spoke 12 which traverses it, and the tube 14 which surrounds it, a free space which is proportionate to the compression resulting from the load.

The section of the sleeve varying necessarily with the elasticity of the material and the load it is intended to support, the above stated condition may be fulfilled without increasing the diameter of the tube by giving the plug the form of a hollow bobbin or sleeve especially shown by the Fig. 5. The space 18 comprised between the planes $x$ and $y$ is proportionate to the limit of compression which it is intended to obtain. There results, therefore, from the compression of the sleeves under the influence of the increased tension supported by certain number of spokes as a consequence of a shock due to the encounter of an obstacle or for any other reason, a lengthening of these spokes which is proportionate to this increased tension, while those between them, the tension whereof diminishes, are shortened by the expansion of the bobbins under the said decrease of their load. The hub of the wheel can thus move in the circle formed by the rim and inversely, it assumes again its position as soon as the cause of this displacement ceases. The successive motions of the rim and the hub, deadened by the elasticity of the bobbins cause the rolling of the car to be softened.

In the arrangement shown by the Figs. 3 and 4 the spokes are formed by two tubes 19 and 20 which are slidingly engaged one in the other. The tube 20 is secured to the hub by the generally used means; it incloses the rubber bobbin 21 the compression whereof between the stationary washer 22 and the movable one 23 is produced by the tension of the rod 24. The latter is attached to the rim 25 by a nut 26 which allows of a convenient tension being given to it and of the wheel being centered. The shoulder resulting from the contracting of the part of the tube 20 which penetrates into the tube 19 allows of the washer 22 being conveniently secured in place. Finally the tube 19 is secured to the rim by means of bolts 27 which at the same time unite the two rings of stamped and set steel plates 5 and 6 forming the said rim and, if necessary, keep them at the convenient distance apart.

A wheel constructed in the above described manner with elastic spokes has the ordinary aspect of a wheel provided with wooden spokes. It may be provided with an iron or other tread it being sufficient to modify to this effect if necessary the section of that part of the rim which is intended to receive the tire.

In the form shown by Fig. 6 each spoke contains two elastic bobbins 28 and 29 one whereof supports the hub which is suspended from the other: it follows that all the bobbins work in a constant manner. Between the two parts 30 and 31 of each spoke is arranged a sleeve 32 made of bronze wherein holes are pierced which are adapted to receive graphite pastils 39 providing perfect lubrication during the relative movements of the said two parts of the spoke. Each spoke is attached to the rim and to the hub in the following manner. In the extremity of each end 30 is welded a mass 33 provided with a hollow 34 wherein are introduced and riveted the ends of spring blades forming an eyelet 35; the latter is hooked to a circular projection 36 made integral with the rim 37 on the hub and is engaged between the said circular projection and a projection 38 having the form of a horse shoe also made integral with the rim or with the hub. A plate 40 is applied against the projection 38 in order to recover the whole and is kept in place by a screw 41.

Having now fully described my said invention, what I claim and desire to secure by Letters Patent is:

1. In a vehicle wheel the combination with the hub and the rim, of spokes made each of two parts one whereof being secured to the said rim and the other to the hub, of a solid tubular elastic body interposed between the said parts of the spokes and means for rigidly keeping the two parts of the spokes in line, substantially as and for the purpose set forth.

2. In a vehicle wheel the combination with the hub and the rim, of spokes made each of two parts respectively secured to the hub and the rim, a tube secured at one of its ends to the hub part of the spoke, of a plug closing the other end of the said tube and adapted to slide on the rim part of the spoke a washer secured to the end of that latter part of the spoke and a rubber sleeve, the walls whereof are tapering towards the ends, this rubber sleeve being arranged on the rim part of the spoke between the said washer and the said tube closing plug substantially as and for the purpose described.

3. In a vehicle wheel the combination with the hub and a rigid rim, of spokes made of two parts slidingly engaged with one another and secured respectively to the hub and to the rim, of elastic sleeves interposed between these parts and a sleeve arranged at the frictional contact places of the two parts of the spoke and provided with holes containing graphite lubricating pastils substantially as and for the purpose set forth.

4. In a vehicle wheel the combination with the hub and a rigid rim of elastic spokes made each of two parts slidingly secured one to the other, one of these parts being secured to the hub and the other being provided at its outer end with a block secured to that part of the spoke, of a series of spring plates bent in an eyelet shape and secured to the said block, of a circular projection arranged on the rim and adapted to be engaged by the said eyelet, of a horse shoe shaped projection made integral with the rim and surrounding the said circular projection at a certain distance apart, of a plate covering the circular projection, the eyelet and the horse shoe shaped projection and means for securing the said plate in place substantially as and for the purpose set forth.

In testimony whereof I have hereunto set my hand in presence of two witnesses.

PIERRE LAMURE.

Witnesses:
GREGORY PHELAN,
C. VAN NELSEN.